United States Patent [19]
Goto

[11] Patent Number: 5,880,887
[45] Date of Patent: Mar. 9, 1999

[54] LENTICULAR LENS SHEET, DISPLAY FRONT PLATE AND TRANSMISSION TYPE PROJECTION SCREEN

[75] Inventor: Masahiro Goto, Tokyo-To, Japan

[73] Assignee: Dai Nippon Printing Co., Ltd., Tokyo-to, Japan

[21] Appl. No.: 911,419

[22] Filed: Aug. 14, 1997

[30] Foreign Application Priority Data

Aug. 16, 1996 [JP] Japan ................................. 8-216501
Jun. 26, 1997 [JP] Japan ................................. 9-170568

[51] Int. Cl.⁶ .................................................. G02B 27/10
[52] U.S. Cl. ........................ 359/626; 359/621; 359/622; 359/628; 359/456; 359/457
[58] Field of Search .................................. 359/619, 621, 359/622, 626, 627, 628, 454, 455, 456, 457

[56] References Cited

U.S. PATENT DOCUMENTS

| | | | |
|---|---|---|---|
| 3,484,599 | 12/1969 | Little ........................................ | 359/622 |
| 4,431,266 | 2/1984 | Mori et al. ............................... | 359/456 |
| 4,727,533 | 2/1988 | Erbert ...................................... | 359/621 |
| 5,056,912 | 10/1991 | Hamada et al. ......................... | 359/456 |
| 5,400,114 | 3/1995 | Yoshida et al. ......................... | 359/457 |
| 5,615,048 | 3/1997 | Davies et al. ........................... | 359/622 |
| 5,699,190 | 12/1997 | Young et al. ............................ | 359/619 |
| 5,724,182 | 3/1998 | Mitani et al. ........................... | 359/457 |

FOREIGN PATENT DOCUMENTS

| | | |
|---|---|---|
| 0 371 432 | 6/1990 | European Pat. Off. . |
| 2-025436 | 5/1990 | Japan . |
| 3-233394 | 12/1991 | Japan . |

*Primary Examiner*—Loha Ben
*Attorney, Agent, or Firm*—Morgan & Finnegan LLP

[57] ABSTRACT

A lenticular lens sheet includes a substrate layer, a lens portion having a lenticular lens configuration which is shaped so as to be convex on a light incident face side of the substrate layer and an achromatic or chromatic colored layer formed adjacent to at least a light incident face of the lens portion. The substrate layer is not colored. Alternatively, it is colored thinner than the colored layer. With the arrangement, it is possible to restrict reflection of outside light and enhance the contrast of picture without reducing the intensity of image light so much. Further, it is possible to realize fine pitching of images.

19 Claims, 8 Drawing Sheets

LENTICULAR LENS SHEET, DISPLAY FRONT PLATE AND TRANSMISSION TYPE PROJECTION SCREEN

BACKGROUND OF THE INVENTION

The present invention relates to a lenticular lens sheet, a display front plate and a transmission type projection screen, all of which are suitable for projecting and observing an image supplied from an image source having a cell structure, such as a liquid crystal device (LCD), a digital micro-mirror device (DMD) or the like.

In the conventional art, there is a known rear projection type television which includes three colored (i.e., red, green, blue) cathode ray tubes (CRT) as the image source and a transmission type projection screen as the picture screen. For the above-mentioned transmission type projection screen, it has been required to diffuse image light in a wide range and decrease an influence of outside light.

Figure 4:
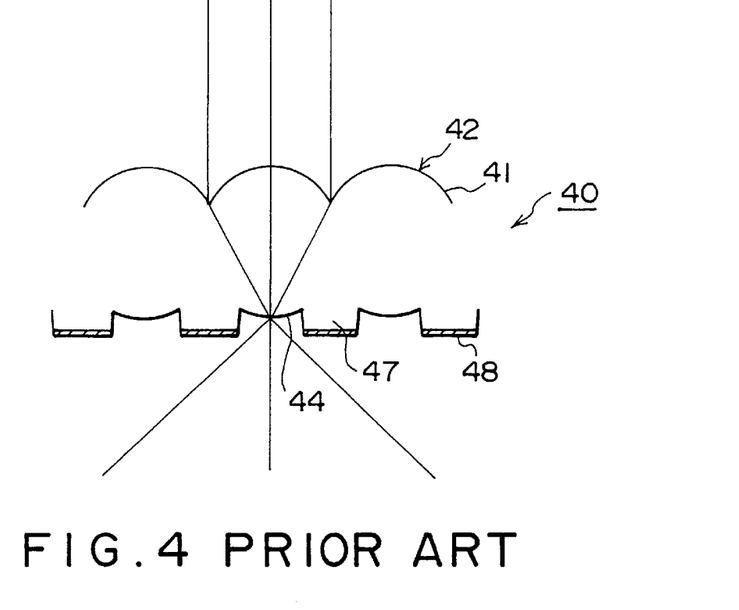
FIG. 4 is a partial view of the conventional black-striped (BS) lenticular lens sheet.

FIG. 4 shows an example of the conventional transmission type projection screen. In order to meet the above-mentioned requirements, this transmission type projection screen comprises a lenticular lens sheet 40. The lenticular lens sheet 40 is provided, on an light incident face side 41 thereof, with a converging lens section 42, such as a lenticular lens. On a light emitting face 44 in the vicinity of a focus of the lens section 42, the lenticular lens sheet 40 includes a plurality of non-light emitting sections 47 covered with light absorbing layer 48 which will be referred to black stripes (BS), hereinafter. With the arrangement, the BS lenticular lens sheet 40 is capable of diffusing the light while decreasing the influence of the external light.

As the image source, a conventional art projection television has been developed with the above-mentioned LCD or DMD. Also in this projection television (TV), the above BS lenticular lens sheet has been employed for purposes of an improvement of diffusion performance and a prevention of the external light from reflection.

In the above-mentioned projection TV, however, there is a possibility of occurrence of moire due to the sampling effect of lenticular lens in case of projecting an image on the lenticular lens sheet having the above-mentioned cyclic structure repeated at regular pitches.

It is an established theory that, in order to prevent the occurrence of moire, a pitch of the lenticular lens is preferably decreased so as to be 1/3.5 (equal to ten thirty fifth) or less of a pitch of lattice pattern projected.

In addition, it should be noted that the projection TV having the LCD or DMD often produces a glaring picture which is called "scintillation". However, to decrease the pitch of the lenticular lens would be effective in order to weaken the above-mentioned scintillation.

Meanwhile, the transmission type projection screen having the BS lenticular lens sheet as shown in FIG. 4 operates to diffuse the light in a wide range of an angle of 40 degrees or more. Thus, in order to form the black stripes (BS) on the transmission type projection screen simultaneously, a distance between the incident lens and the light emitting face has to be established to be one point three times as large as a pitch of the incident lens. Under such a situation, in order to make the moire constituted by the lattice pattern projected on the screen and each pitch of the lens, inconspicuous, it is required to establish a lens pitch less than 0.4 mm and a lens thickness less than 0.54 mm.

However, if reducing the thickness of the screen as mentioned above, a rigidity of the screen will be deteriorated to get difficult to maintain the screen flat. In addition, it is very complicated to mold such a thin lens sheet with accuracy by an extruding mold method or the like.

Further, it has been executed that, due to the above-mentioned reason, the transmission type projection screen as the projection TV using the LCD or the DMD utilizes a lenticular lens sheet, which is provided only on a light emitting face side with colored lenticular lenses (light emitting side lenticular lens sheet), a lenticular lens sheet which is provided only on a light incident face side with colored lenticular lenses (light incident side lenticular lens sheet) or the like.

In the light emitting-side lenticular lens sheet some are shaped to have partially circular or partially elliptical cross sections, and others are shaped so as to utilize total reflection.

In the former lenses, there is a common problem that it is difficult to broaden a viewing angle since its lens angle relative to the projecting light exceeds the critical angle at respective foot portions thereby to cause the total reflection of the projecting light.

On the other hand, the later lens have a common problem of impossibility of an exact die transferal by the extruding process due to their singular configurations, so that they have no choice but to be produced by the casting process having a poor productivity.

Figure 6:
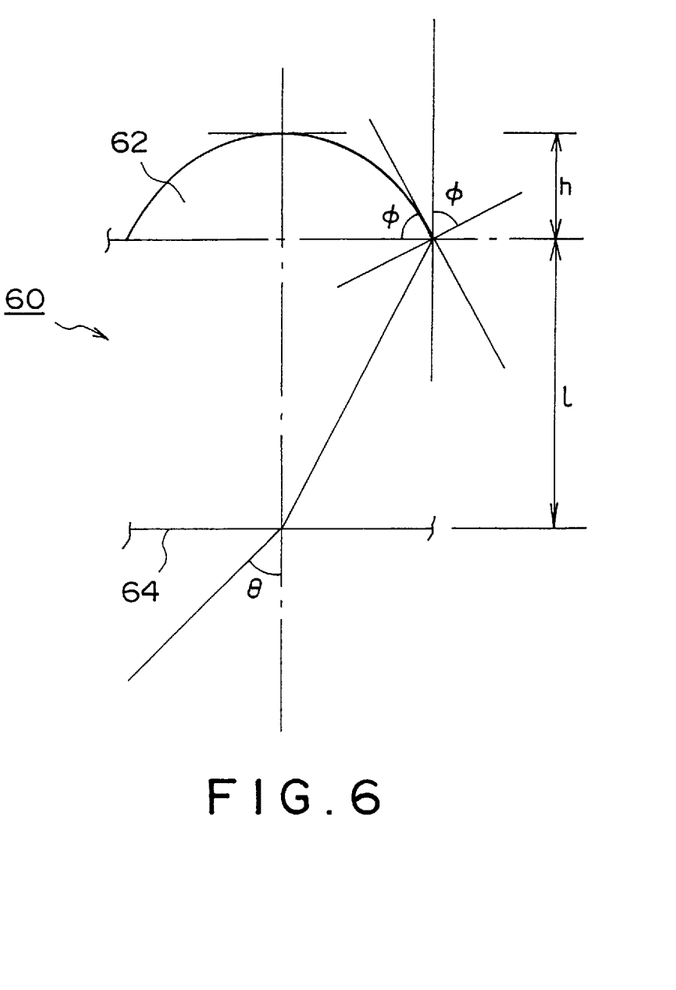
FIG. 6 is a view showing a relationship between an inclination angle of the lenticular lens sheet in its incident position of light and an emission angle of the light.

FIG. 6 shows a relationship between an inclination angle at a light incident position of the light incident-side lenticular lens and the emission angle of the light. In FIG. 6, a letter $\phi$ designates a foot angle at the foot portion of the incident lens, a letter $\theta$ an emission angle of the light entering into the foot portion of the lens, an alphabet h a height of the incident lens, and l a distance between an incident point (i.e. the foot portion of the lens) and a converging point, respectively. Table 4 shows the emission angle and respective positions of the converging points relative to the lens angle at the foot portion of the lens. Note, in this table, an alphabet n denotes a refractive index and p a pitch of the lens.

TABLE 4 emission angle relative to angle of foot portion of incident lens
$n = 1.5, p = 1.0$ mm

| $\phi$ [deg] | $\theta$ [deg] | l [mm] | h [mm] |
| --- | --- | --- | --- |
| 30 | 15.9 | 2.69 | 0.14 |
| 40 | 22.3 | 1.92 | 0.19 |
| 50 | 29.7 | 1.42 | 0.26 |
| 60 | 38.9 | 1.08 | 0.33 |
| 70 | 51.0 | 0.83 | 0.42 |

In order to accomplish a wide view angle having more than the emission angle $\theta$ of 40 degrees in the light incident-side lenticular lens sheet, it is required to establish the lens angle $\phi$ more than 60 degrees at the foot portion of the lens, as shown in FIG. 6 and Table 4.

Figure 3A:
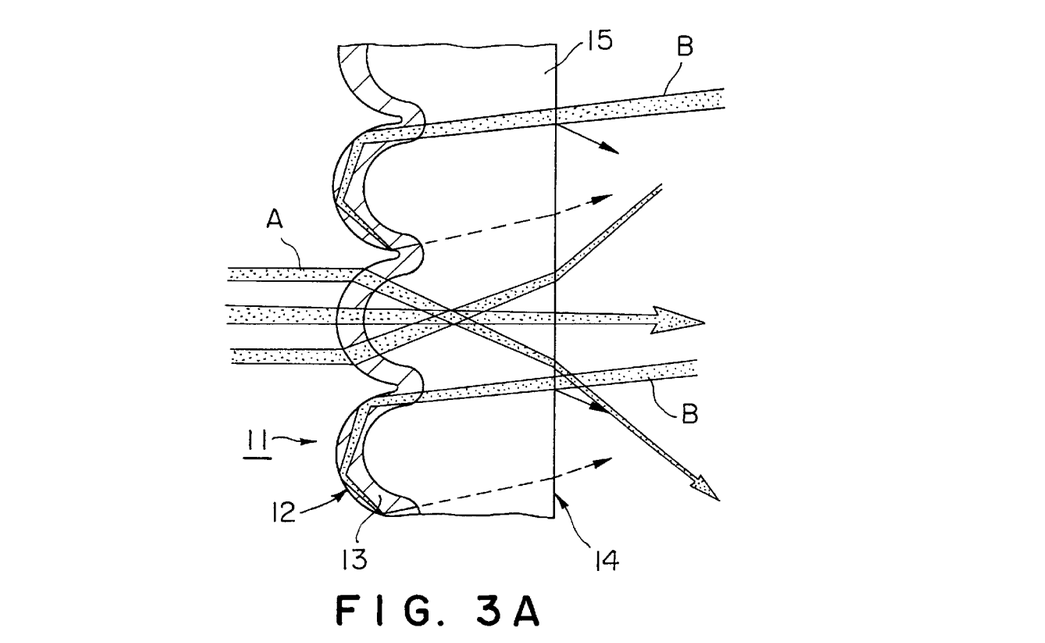
FIG. 3A is an explanatory diagram showing the present light incident side lenticular lens sheet and the paths of lights passing therethrough.
Figure 3B:
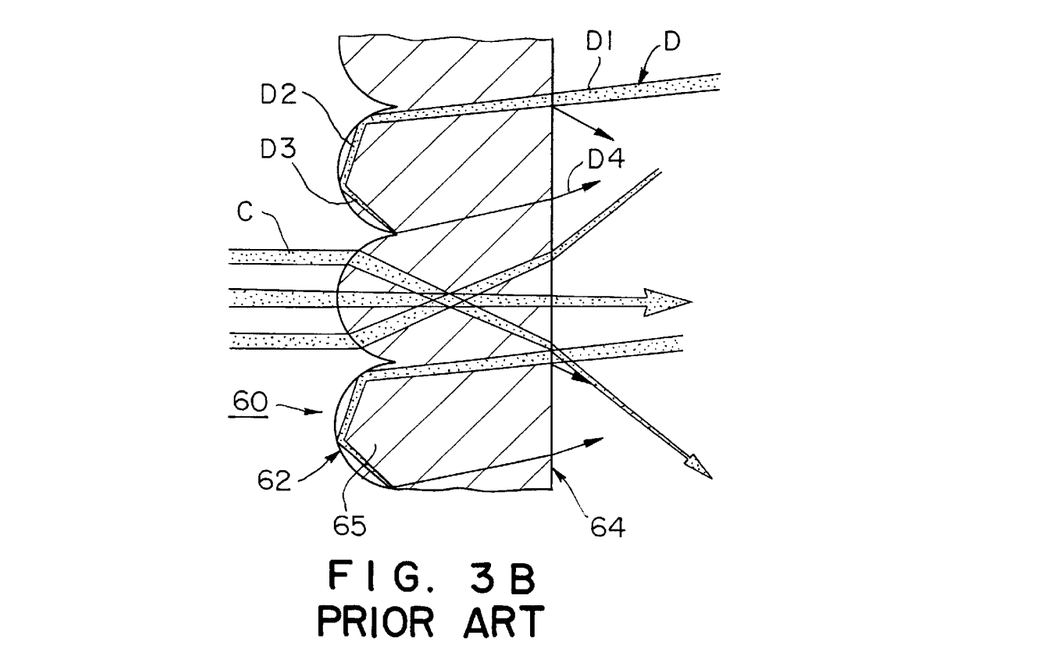
FIG. 3B is an explanatory diagram showing the prior art lenticular lens sheet and the paths of lights passing therethrough.

However, if increasing the lens angle simply, the external light entering into the lens through the light emitting face will be totally reflected on the incident lens portion, so that it projects from the light emitting face again together with the image light, as shown in FIG. 3B. In such a case, it is expected that the contrast of image is influenced remarkably and disadvantageously. It should be noted that, since most of the BS lenticular lens sheets have the light emitting faces which are disposed at general condensing points of their incident lenses, a distance between the incident lens portion and the light emitting face will be equal to a distance of (h+1). In Table 4, the distance (h+1) in case of 60 degrees of the lens angle at the foot portion of the lens φ is set to 1.41, while the distance (h+1) in case of 70 degrees of the lens angle φ is set to 1.25. Thus, it will be understood that, as mentioned before, the distance between the incident lens portion and the light emitting face must be established to be about 1.3 times as large as the lens pitch. This means that a reduction of a pitch of the lens makes a thickness of the lens thinner, thereby causing the rigidity of lens to be weakened and the forming of lens to be complicated.

SUMMARY OF THE INVENTION

Accordingly, it is therefore an object of the present invention to provide a lenticular lens sheet, a display front plate and a transmission type projection screen which are capable of preventing the reflection of outside light for the improvement of contrast of image without decreasing the intensity of image light excessively and by which the fine-pitching of the image can be realized.

The object of the present invention described above can be accomplished by a lenticular lens sheet comprising:

a substrate layer;

a lens portion having a "lenticular lens" configuration which is shaped so as to be convex on an light incident face side of the substrate layer; and an achromatic or chromatic colored layer formed adjacent to at least an incident face of the lens portion;

wherein the substrate layer is either non-colored or colored paler than said colored layer.

In the present invention, preferably, the colored layer has a configuration along a shape of the lens portion.

More preferably, the colored layer has a thickness from 0.05 to 1.0 times as large as a pitch of the lenticular lens configuration.

Preferably, the colored layer has a thickness less than one a half (½) of a thickness of the lenticular lens sheet.

Preferably, the lenticular lens configuration of the lens portion has a substantially elliptical cross section and a thickness of the colored layer at the top of the lenticular lens configuration is represented by:

$$t_1 = b - b^2/(a^2+b^2)^{1/2}$$

wherein $t_1$ is the thickness of the colored layer at the top portion;

a is a transverse diameter of the elliptical cross section; and b is a longitudinal diameter of the elliptical cross section.

More preferably, a thickness of the colored layer is established so as to meet an inequality represented by:

$$t_1 > t_2$$

wherein $t_1$ is a thickness of each center part of the lens portion; and $t_2$ is a thickness of each foot part of the lens portion, the thickness being perpendicular to a lens surface thereof.

Preferably, at least the colored layer contains additive diffusion agents.

More preferably, it is established of an unequal relationship represented by:

$$0 \leq C_0 < C_1$$

wherein $C_0$ is a weight concentration of an additive diffusion agents added into the substrate layer; and $C_1$ is a weight concentration of the additive diffusion agents added into the colored layer.

Preferably, the lenticular lens sheet of the invention further comprises a diffusion layer which is formed between the colored layer and the substrate layer and into which diffusion agents are mixed and it is preferable that the colored layer does not contain the diffusion agents and the substrate layer is either non-colored or colored paler than the colored layer.

More preferably, the lenticular lens configuration includes a portion a tangential line of which exhibits an angle more than a critical angle with respect to a surface of the lenticular lens sheet.

In the present invention, preferably, the substrate layer has a light emitting face consisting of a flat surface or a mat surface.

More preferably, a thickness of the lenticular lens sheet is more than 1.5 mm.

It is also preferable that the substrate layer is provided, on a light emitting face thereof, with at least one of an anti-reflection layer, a low reflecting layer, a polarization filtering layer, an anti-static layer, an anti-glare treatment layer and a hard coated treatment layer.

According to the present invention, there is also provided a display front plate comprising:

a substrate layer; and a lens portion having a "lenticular lens" configuration which is shaped so as to be convex on a light incident face side of the substrate layer;

wherein the lens portion has an achromatic or chromatic colored layer formed adjacent to at least a light incident face of the lens portion;

wherein the substrate layer has a light emitting face consisting of a flat surface or a mat surface.

In the present display front plate, preferably, the substrate layer is provided, on a light emitting face thereof, with at least one of an anti-reflection layer, a low reflecting layer, a polarization filtering layer, an antistatic layer, an anti-glare treatment layer and a hard coated treatment layer.

Furthermore, there is also provided a transmission type projection screen comprising:

a lenticular lens sheet including:

a substrate layer;

a lens portion having a "lenticular lens" configuration which is shaped so as to be convex on a light incident face side of the substrate layer; and an achromatic or chromatic colored layer formed adjacent to at least a light incident face of the lens portion;

wherein the substrate layer is either non-colored or colored paler than said colored layer; and a Fresnel lens sheet arranged on a light source's side of said lenticular lens sheet.

Preferably, the present transmission type projection screen further comprises a display front plate arranged on a viewer's side of the lenticular lens sheet, wherein the display front plate comprises:

a substrate layer; and a lens portion having a "lenticular lens" configuration which is shaped so as to be convex on a light incident face side of the substrate layer;

wherein the lens portion has a colored layer formed adjacent to at least an incident face of the lens portion;

wherein the substrate layer has a light emitting face consisting of a flat surface or a mat surface.

More preferably, the substrate layer is provided, on a light emitting face thereof, with at least one of an anti-reflection layer, a low reflecting layer, a polarization filtering layer, an anti-static layer, an anti-glare treatment layer and a hard coated treatment layer.

Preferably, the transmission type projection screen has a transmissivity of total light beams from 40 to 70 per cent.

The above and other features and advantages of this invention will become apparent, and the invention itself will best be understood, from a study of the following description and appended claims, with reference to the attached drawings showing preferred embodiments of the invention.

DESCRIPTION OF THE PREFERRED EMBODIMENT

Embodiments of the present invention will be described with reference to the drawings.

Figure 1A:
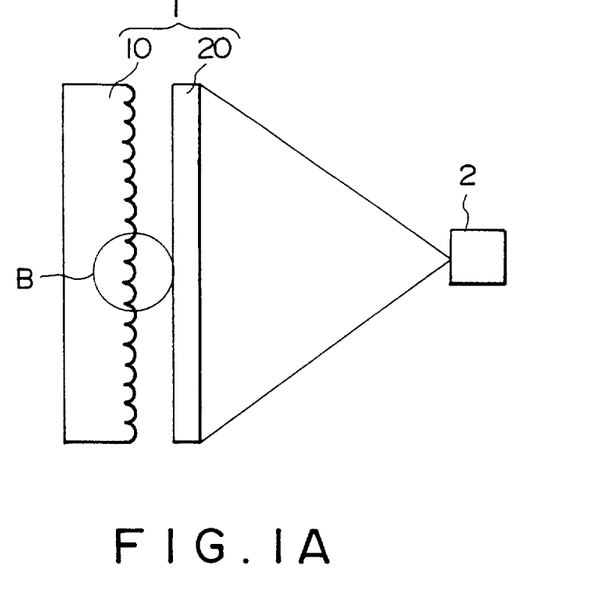
FIG. 1A shows a lenticular lens sheet and a translucent screen in accordance with an embodiment of the present invention.
Figure 1B:
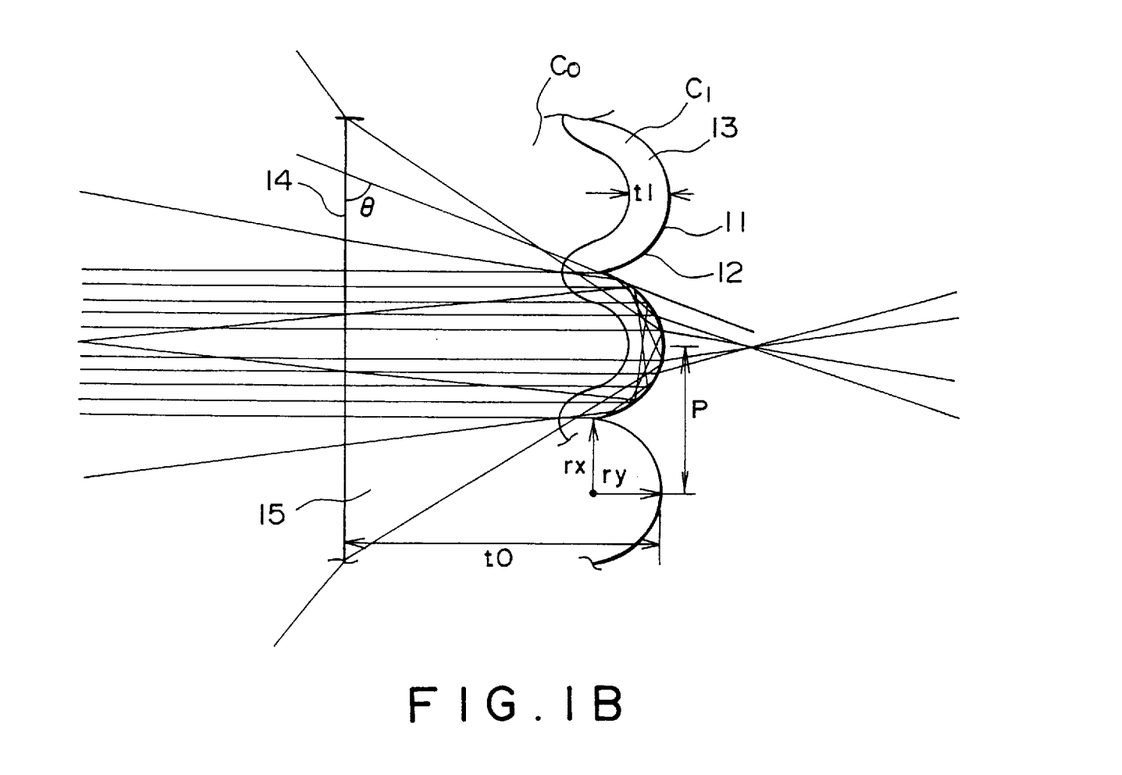
FIG. 1B is an enlarged view of a portion B of FIG. 1A, also showing outside lights entering the portion.
Figure 2:
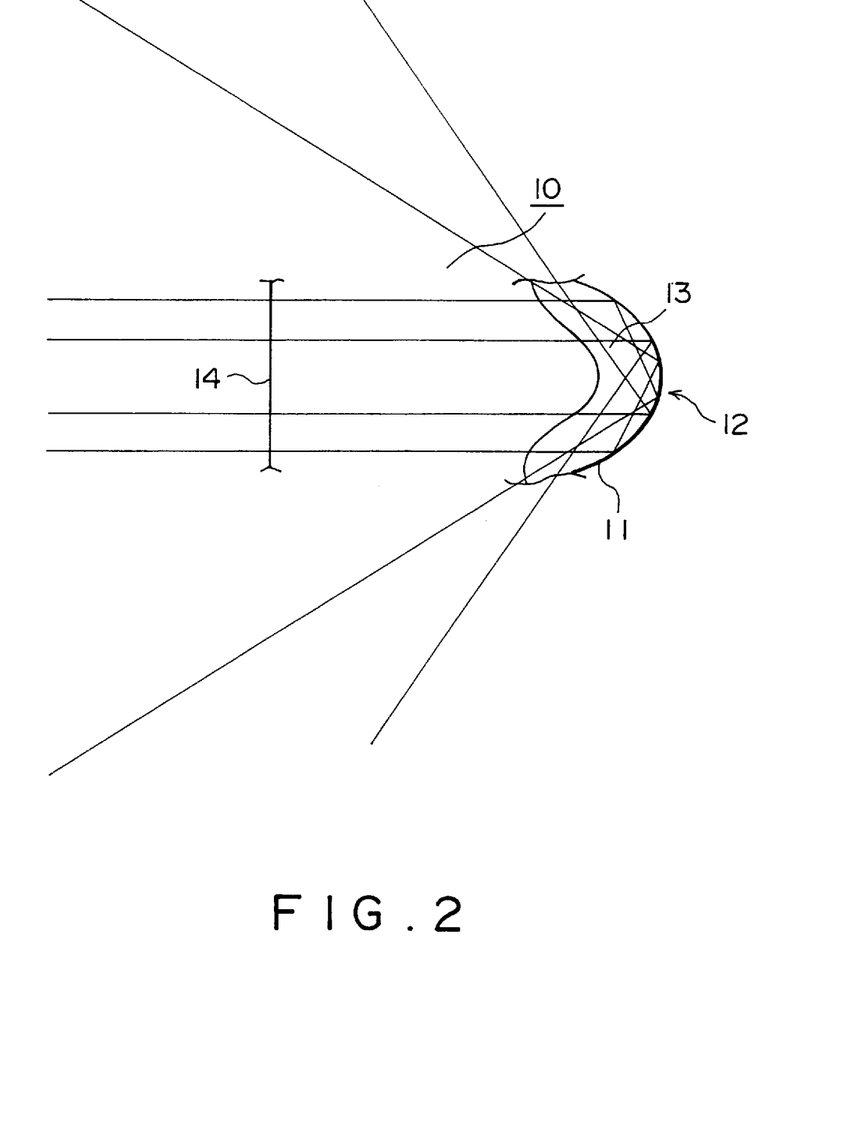
FIG. 2 is an explanatory diagram showing paths of the outside light reflected on the lenticular lens sheet of the embodiment.

FIGS. 1A and 1B show a lenticular lens sheet and a transmission type projection screen in accordance with an embodiment of the present invention. FIG. 2 is an explanatory diagram of the path of outside light reflected by the lenticular lens sheet.

(Re. Embodiment of Transmission Type Projection Screen)

As shown in FIG. 1A, the transmission type projection screen 1 comprises a lenticular lens sheet 10 and a Fresnel lens sheet 20 and constitutes a rear projection television system together with a light source 2 of a single-lens type of LCD projector.

(Re. Embodiment of Lenticular Lens Sheet)

As enlarged in FIG. 1B, the lenticular lens sheet 10 is provided, on a light incident face 11 thereof, with a lens portion 12 in the form of a convex lenticular lens. The lens portion 12 has an achromatic or chromatic colored layer 12 formed in the vicinity of the incident face 11. The lenticular lens sheet 10 further includes a substrate layer 15 extending from the colored layer 13 up to the light emitting face 14.

This colored layer 13 has a function to enhance a contrast of the image in spite of the lenticular lens sheet 1 only having the lenticular lenses on one side (the incident face) thereof.

(Re. Function of Colored Layer)

We now describe an effect (i.e. fine contrast) brought by the lenticular lens sheet 10 of the embodiment in comparison with a conventional art lenticular lens sheet 60. FIG. 3B is an explanatory diagram of the function of the conventional art lenticular lens sheet 60 of "colored-body" type, while FIG. 3A is an explanatory diagram of the function of the colored layer 13 of the present lenticular lens sheet 10.

The conventional lenticular lens sheet 60 of FIG. 3B, which has one incident face on one side, is a sheet of the "colored-body" type including a darkened or colored substrate layer 65. In the lenticular lens sheet 60, external light D1 entering from an observer's side is totally reflected by a lens portion 62 provided on an incident face 61, so that external light D4 emits to the viewer's side again. During the reflection, the light D1 repeats its reflections along a "lenticular lens" profile of the lens portion 62 (D1→D2→D3→D4).

In the lenticular lens sheet 10 of the embodiment in FIG. 3A, owing to the formation of the colored layer 13 along a course of the above-mentioned totally reflected light, an optical path length of the external light B running in the colored layer 13 becomes to be 5 to 10 times as long as the optical path length of the image light A in the same layer 13. On the contrary, in case of the conventional colored-body type of lenticular lens sheet 60, the former length is at the most 2 to 3 times as long as the later length.

Consequently, as the lenticular lens sheet 10 of the invention is capable of restricting the reflection of the outside light B without reducing the intensity of the image light A so much, it is possible to provide a screen exhibiting fine contrast.

(Re. Lens Portion)

The lenticular lens sheet 10 of the embodiment absorbs the total reflecting external light B by the lens portion 12 of the light incident face 11 effectively. Accordingly, the lens portion 12 must be provided with a part which is inclined so that its lens angle at the foot portion of the lens $\phi$ (FIG. 5) relative to the screen face is more than at least the critical angle (approx. 45 degrees). While, if all the lens portion of the lenticular lens sheet is inclined with the angle $\phi$ less than the critical angle, such a lens sheet would not hold a dominant position to the colored-body type of lenticular lens sheet 60 of FIG. 3B.

Figure 5:
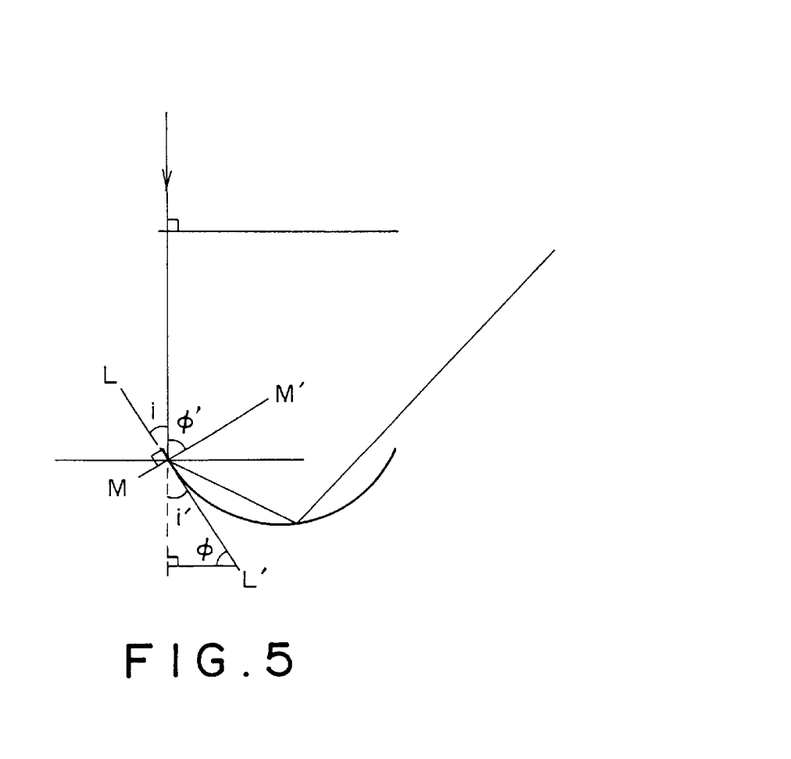
FIG. 5 is an explanatory diagram of a lens angle of the lenticular lens sheet of the embodiment, with respect to a screen face.

FIG. 5 is an explanatory diagram for exhibiting a fact that the incident angle $\phi'$ of the external light, which has entered into the lenticular lens perpendicularly, in case of projecting from the light incident lens portion or totally reflecting therefrom is equal to the lens angle φ of the emitting or incident point relative to a screen face. In FIG. 5, since a tangential line L–L' intersects with a normal M–M' perpendicularly and therefore an equation of i=i' is established, an equation of φ=φ' is established consequently.

Thus, in order to totally reflecting the external light on the surface of the light incident lens portion, it is required that the incident lens portion contains a part of which lens angle φ is more than the critical angle $\sin^{-1}$ (1/n). (n: refractive index of lenticular lens sheet)

However, Table 4 show that if the lens angle is 42 degrees, the diffusion angle of only approx. 25 degree will be obtained. Thus, it is desirable that the lenticular lens configuration of the lens portion 12 normally has a portion formed at an angle more than 60 degrees so that the diffusion angle becomes to be more than 40 degrees.

(Re. Coloring Method for Colored Layer)

The coloring (or darkening) for the achromatic or chromatic colored layer 12 may be carried out by mixing or dispersing dyes and fine pigments into the mold resin of the lenticular lens sheet 10.

(Re. Color for Colored layer)

Achromatic-color, such as black, gray etc., or chromatic color which absorbs or permeates a light in specific color for controlling the balance of three primary colors (red, green, blue) in spectral characteristics of the light source is applicable to the color for the colored layer.

(Re. Coloring Density for Colored Layer)

In view of restricting the influence of the external light without decreasing the transmissivity of the projecting light of the light source 2 so much, preferably, the coloring density of the colored layer 13 is established to be higher than that of a portion (i.e. the substrate layer 15) on the light emitting face's side of the layer 13, while the coloring density of the substrate layer 15 is maintained to be either zero or a lowered value.

Figure 7:
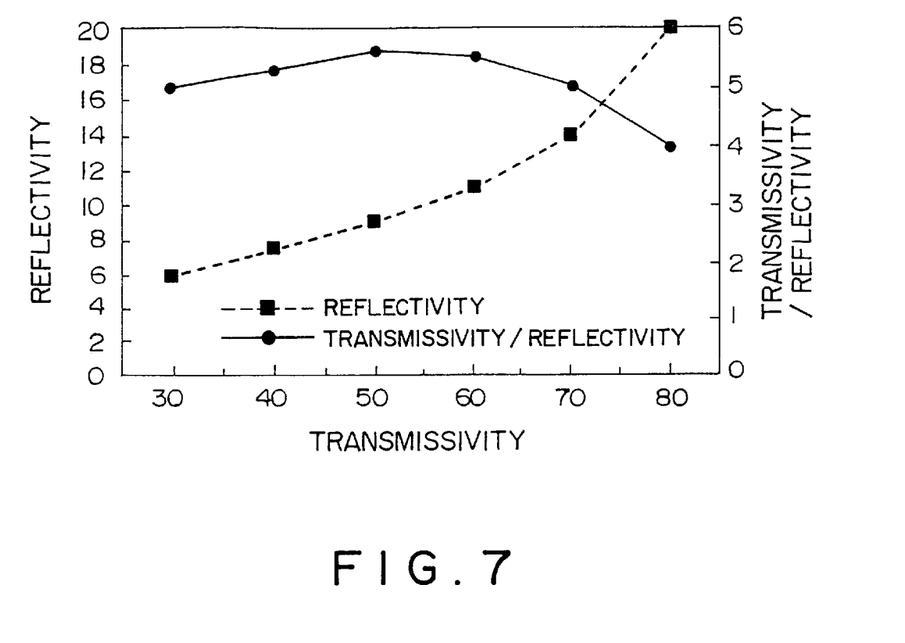
FIG. 7 is a diagram showing a relationship between transmissivity of the transmission type projection screen of the embodiment and the contrast.

FIG. 7 shows a relationship between the transmissivity of the transmission type projection screen of the embodiment and the contrast.

It is preferable to establish the coloring density so that the screen transmissivity is in a range of 40 to 70%. That is, if the coloring density is reduced so that the transmissivity becomes higher than 70%, the intensity of the external light, which returns the observer's side after total-reflecting on the lens portion 12, will be increased thereby to influence the contrast badly in spite of the improved transmissivity. Conversely, if the coloring density is increased in a manner that the transmissivity becomes to be less than 40%, the reflection of the external light on the light emitting face 14 will come into prominence together with the deteriorated transmissivity of the image light, so that the contrast will get worse, too.

Note, in order to provide FIG. 7, a variety of the present light incident side lenticular lens sheets having various coloring densities for the colored layers were firstly manufactured. Subsequently, the transmissivity and reflectivity of these samples were measured by using a spectrophotometer (UV 2100 made by Shimazu Seisakusho Co. Ltd.). The obtained transmissivity, the reflectivity and the calculated ratios therebetween (i.e. values of transmissivity/reflectivity) were plotted in the figure, respectively. In FIG. 7 obtained in this way, a vertical axis on the left hand denotes a level of the reflectivity, while another vertical axis on the right hand denotes a level of the ratio of transmissivity to reflectivity. FIG. 7 exhibits that although a reduction in coloring density causes the transmissivity of the lenticular lens sheet to be raised, a curve of reflectivity of the sheet rises abruptly as the transmissivity exceeds 70% nearly. Because the reduction in coloring density of the lenticular lens sheet causes the colored layer not to absorb the external light sufficiently.

Further, since the lenticular lens sheet of the invention does not absorb the external light reflected on the light emitting face on the observer's side, even when increasing the coloring density thereby to reduce the transmissivity, the ratio of the transmissivity to the reflectivity gradually increases to reach its peak at 50% in transmissivity. This is the reason it would be better to color the colored layer so that the transmissivity is included in the range of 40 to 70%.

Additionally, in case of adopting a transmission type of LCD source as the light source 2, it is more preferable to realize the transmissivity of 45 to 60%, because such a LCD source does not have a large output and therefore, there is a limit to sacrifice the transmissivity.

(Re. Dimensions of Colored Layer)

It is desirable that a thickness $t_1$ of the colored layer 13 is 0.05 to 1.0 times as large as the pitch of the lenticular lens 12. Again, it is also desirable that the thickness $t_1$ of the colored layer 13 is less than a half of the sheet thickness $t_0$. These preferable conditions are derived from a purpose of forming the colored layer 13 in a position where the reflected external light is apt to pass.

(Re. Profile of Colored Layer)

Figure 8:
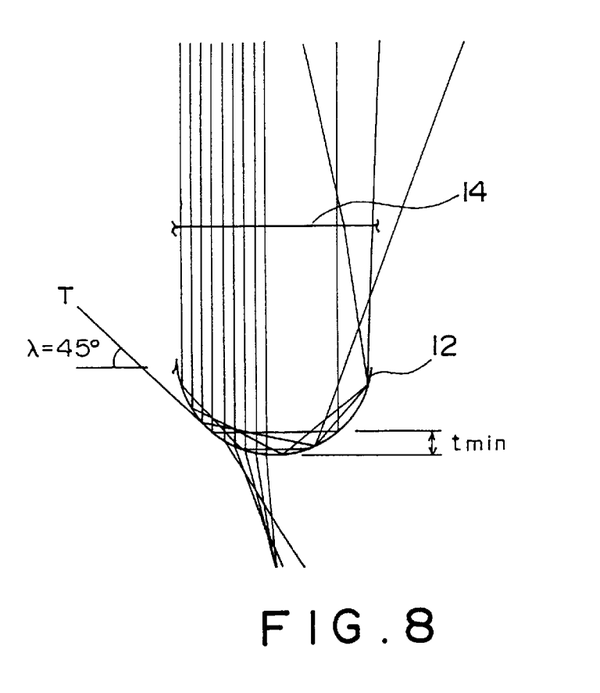
FIG. 8 is a diagram showing an optimum value of thickness of a colored layer of the lenticular lens sheet of the embodiment.

FIG. 8 is an explanatory diagram of an optimum value of the thickness of the colored layer of the lenticular lens sheet in accordance with the embodiment.

As mentioned before, since the lenticular lens sheet 10 of the embodiment makes use of the external light's running along the lens portion 12, it is desirable that the colored layer 13 has a profile along the lens portion 12.

In such a case, a geometric optical minimum thickness $t_{min}$ of the colored layer 13 would be equal to a lens height in a position where an inclination λ of a tangential line T of the lens portion 12 is 45 degrees. (λ=45°).

Further, if the lens portion 12 has an elliptic cross section, the thickness $t_1$ of the colored layer 13 would be obtained by the following equation (1):

$$t_1 = b - b^2 (a^2 + b^2)^{1/2} \tag{1}$$

where a is a transverse diameter (short diameter); and
b is a longitudinal diameter (long diameter).

Additionally, at this time, the image with the finest contrast would be obtained.

In case of the elliptic lenticular lens where a conic coefficient k is equal to 0.45 (=$a^2/b^2-1$) and a lens angle at the foot portion is 60 degrees, the thickness $t_1$ of the colored layer 13 will be about one-tenth of a pitch of the lenticular lens configuration.

Figure 11A:
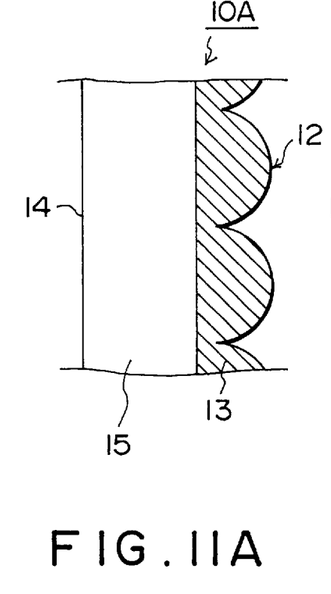
FIGS. 11A, 11B and 11C show respective structures of the lenticular lens sheets in accordance with other embodiments.

While, even if the colored layer 13 is formed to be out of the above-mentioned lens configuration, for example, even when the boundary surface between the colored layer 13 and the substrate layer 15 is flat as shown in FIG. 11A, it is possible to obtain the lenticular lens sheet 10A better than the conventional colored-body type of lenticular lens sheet, as expected from the comparison between FIG. 3A and FIG. 3B.

In this case, it is preferable that the thickness of the colored layer 13 is less than either the pitch of the lenticular lens configuration or at least a half of the sheet thickness.

(Re. Thickness of foot Portion of Colored layer)

Figure 9:
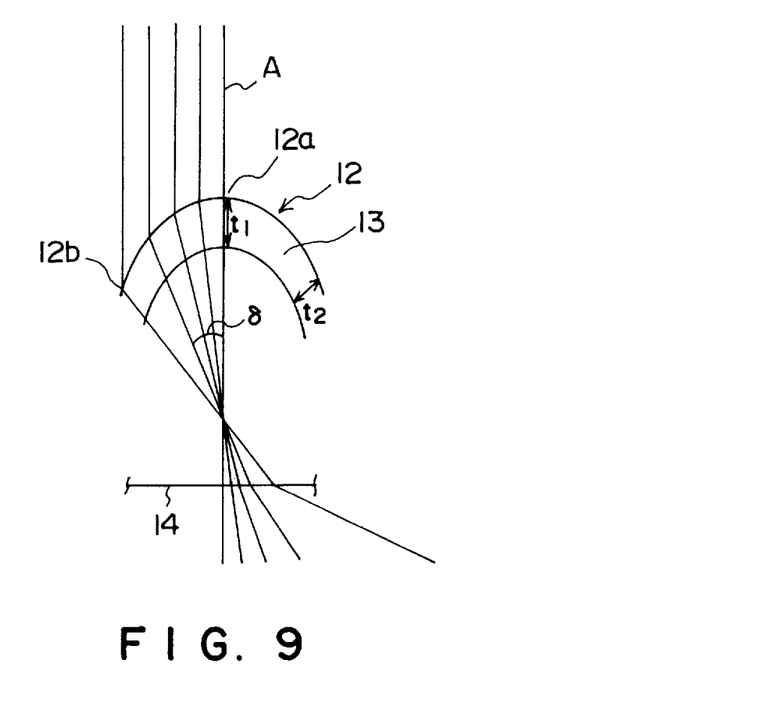
FIG. 9 is a diagram for explanation of a thickness of the colored layer of each lens of the lenticular lens sheet of the embodiment.

FIG. 9 shows the thickness of the colored layer of the lenticular lens sheet of the invention.

In each lens portion 12, preferably, the colored layer 13 is formed in a manner that the thickness $t_1$ at the top of the lens portion 12 exceeds the thickness $t_2$ at the foot of the portion 12. ($t_1 > t_2$)

On the contrary, if the colored layer 13 is formed with an uniform thickness, a light path (in the colored layer 13) of the image light incoming through a foot 12b of the lens portion 12 would be larger than that of the image light incoming through a top 12a, the more the image light would be absorbed in the colored layer 13. As a result, the intensity of light projecting within a range of 30 to 40 degrees would be decreased accordingly.

Figure 10:
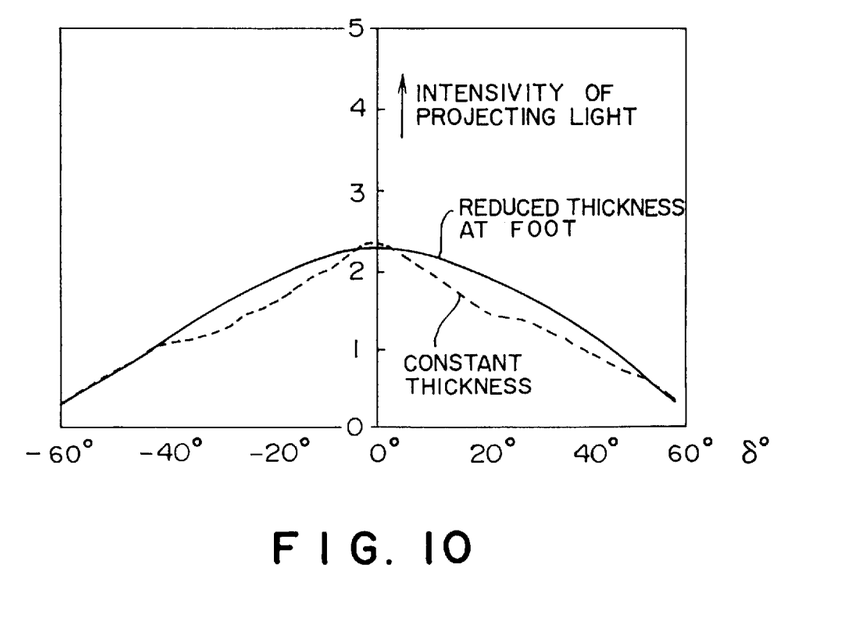
FIG. 10 is a characteristic diagram of light diffusion of the lenticular lens sheet in both cases of a constant thickness and variable thickness of the colored layer.

FIG. 10 is a characteristic diagram of light diffusion, showing a comparison between a case of making a thickness of the foot of the colored layer thin and another case to make the thickness of the colored layer uniform.

According to the embodiment, owing to the reduction in thickness of the foot 12b of the colored layer 13, it is possible to avoid the occurrence of the above-mentioned phenomenon (i.e., a drop in intensity of the emitting light), as shown in FIG. 10.

Furthermore, if the thickness of the colored layer 13 is established corresponding to a path length of the incident light, it will be possible to realize the light diffusive characteristics in accordance with the design of lens advantageously.

(Re. Light Diffusion Layer)

The lenticular lens sheet 10 can contain light diffusion agents added to at least the colored layer 13.

Glass beads, organic crosslinked polymer or the like is applicable to the light diffusion agents. The light diffusion agents are added to 100 weight parts of resinous material forming the lenticular lens sheet 10 by 8 weight parts thereby to apply a preferable vertical diffusion on the light projected from the light source 2.

The light diffusion agents may be applied all over the lenticular lens sheet 10. However, if the light diffusion agents are on the viewer's side of the colored layer 13, the external light will be diffused there to return toward the viewer before a part of the external light reaches the colored layer 13. From this point of view, it is preferable to make the diffusion agents in the substrate layer 15 thin. In other words, providing that a weight concentration of the light diffusion agents mixed into the colored layer 13 is represented by $C_1$ while a weight concentration of the light diffusion agents mixed into the substrate layer 15 is represented by $C_0$, it is desirable to establish a relationship expressed by the following inequality:

$$0 \leq C_0 < C_1$$

Further, in case of laminating a film having various functions as an anti-reflection layer, a polarization filtering layer, a hard-coated layer etc., which will be described later, on the lenticular lens sheet 10, it is desirable that the light emitting face 14 is shaped to be flat. In such a case, it would be better not to mix the diffusion agents into the substrate layer 15 in order to facilitate the formation of lamination.

Figures 11B, 11C:
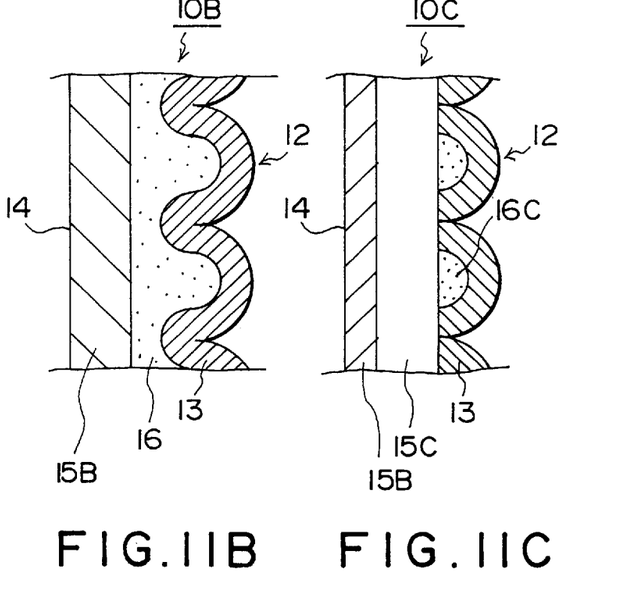

Furthermore, as shown in FIGS. 11B and 11C, the diffusion layers 16, 16C may be formed intermediately without mixing the diffusion agents into the colored layer 13, while the low-density colored layers 15B may be arranged on the viewer's side in order to absorb the light component reflected by the diffusion agents.

(Re. Projecting Face)

The lenticular lens sheet 10 has the light emitting face 14 consisting of a flat face or a mat face. In case of the flat face, it is possible to enhance the clearness of image. Further, since the colored layer 13 is formed in the vicinity of the light incident face 11, the desirable picture can be provided because of no reflection on the light incident face 11 in comparison with the arrangement where a transparent flat panel is disposed on the whole face of the screen.

When the light emitting face 14 is formed to be a flat face, it is possible to dispose the anti-reflection layer, the low-reflection layer, the polarization filtering layer or the like. Then, it is possible to realize the contrast similar to that of the conventional lenticular lens with a light-absorption layer.

Again, the projecting face 14 may be provided with the hard-coated layer, the anti-glare layer, the antistatic layer etc.

Note, in case of the light emitting face 14 consisting of the mat face, it is possible to provide an anti-glare face on the screen.

(Re. Thickness of Sheet)

In this way, owing to the flatness of the light-emitting face 14, the lenticular lens sheet of the embodiment can be provided with a variety of functional layers. Therefore, when adopting a plate thickness more than 1.5 mm for ensuring the rigidity, it is possible to abolish the front plate which has been used in the screen having the conventional BS lenticular lens sheet.

(Re. Light Source)

Since the lenticular lens sheet 10 of the embodiment is not provided, on the light emitting face 14, with an optical-axis correcting lens, it is desirable to use the light source 2 in combination with a single-lens or single-tube type of projector which projects the image light by a single lens.

In addition, a LCD projector, a DMD projector or the like, which firstly divides light of a lamp into three primary color components by a dichroic mirror, secondly allows them to transmit through the LCD while giving the image information and finally composes these light components for projection, may be used for the light source 2.

(Re Method of Producing Lenticular Lens)

For example, the lenticular lens sheet of the embodiment may be produced by a first steps of juxtaposing a roll die for forming the light incident face, which has a profile contrary to the lenticular lens sheet to be manufactured, and another roll die for forming the light emitting face, which has a flat or mat surface, a second step of extruding-colored resinous material on the light incident-face side of a space between both roll dies while extruding transparent or colored resinous material, which is thinner than the colored layer and which may contain the light diffusion agents, and a third step of molding them for the sheet. Alternatively, the lenticular lens sheet may be produced by extruding the resinous material between the above dies for molding, while simultaneously introducing a colored film so as to follow the roll die for forming the incident face and subsequently laminating the film on the molded resin.

Furthermore, in the present lenticular lens sheet, a lens layer may be formed on a film substrate by using colored ultraviolet hardened resin.

(Re. Other Embodiments of Lenticular Lens)

FIGS. 11A to 11C show other embodiments of the lenticular lens sheet of the invention.

In FIG. 11A, the shown lenticular lens sheet 10A is provided with the colored layer 13 of which configuration does not follow a profile of the lens. In this way, even if a boundary surface between the colored layer 13 and the substrate layer 15 is flat, it is possible to provide the fine lenticular lens sheet in comparison with the colored-body type of lenticular lens sheet, as estimated from a comparison between FIG. 3A and FIG. 3B. Note, in order to allow the colored layer 13 to play an effect close to the lens portion 12, it is preferable that a thickness of the colored layer 13 is less than either a pitch of the lenticular lens or at least one a half of the sheet thickness.

The lenticular lens sheet 10B of FIG. 11B comprises the colored layer 13 formed along the lens portion 12, a substrate layer 15B colored lightly without any diffusion agents, and an intermediate layer (diffusion layer) 16 with the diffusion agents between the colored layer 13 and the substrate layer 15B.

While, the lenticular lens sheet 10C of FIG. 11C comprises the colored layer 13 formed along the lens portion 12, the substrate layer 15B colored lightly without the diffusion agents and disposed on the side of the light emitting face 14, another substrate layer 15C non-colored with no diffusion agents and an intermediate layer (diffusion layer) 16C with the diffusion agents between the colored layer 13 and the substrate layer 15C.

In these lenticular lens sheets 10B, 10C, it is possible to absorb the reflected light effectively due to the diffusion agents and the light colored layer.

(Re. Another Embodiment of Transmission Type Projection Screen)

Figure 12:
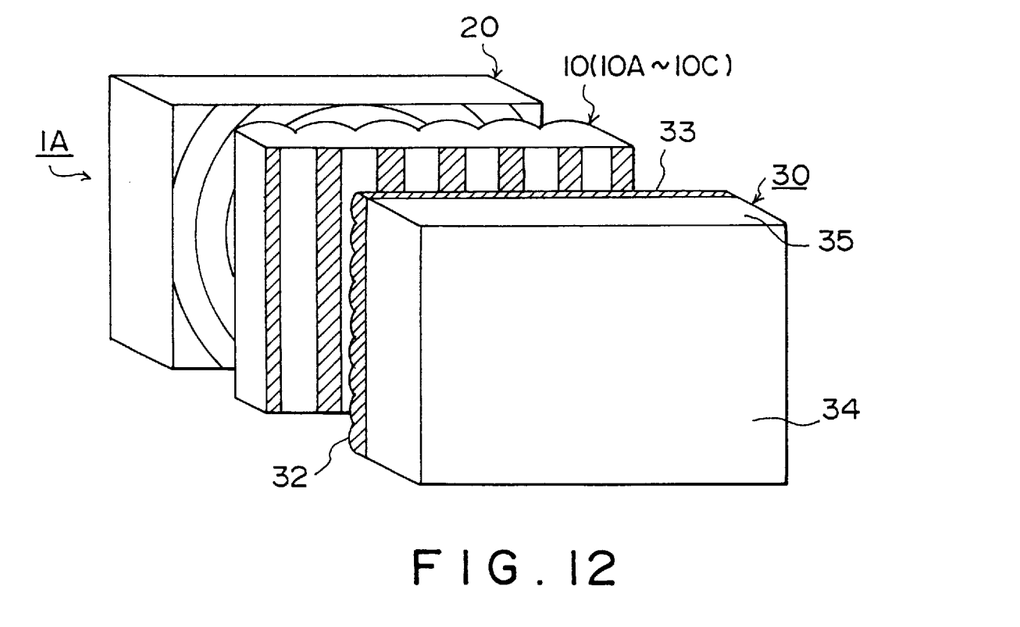
FIG. 12 shows another embodiment of the transmission type projection screen of the invention.

FIG. 12 shows the transmission type projection screen in accordance with another embodiment of the present invention. In view of enhancing the uniformity of brightness of image, it is desirable that the lenticular lens sheet 10 of the embodiment is associated with a Fresnel lens sheet 20 (or a film Fresnel lens sheet) having a Fresnel lens formed on the light emitting side (viewer side), thereby constituting a transmission type projection screen 1A.

In this embodiment, a display front plate 30 is arranged on the viewer's side of the lenticular lens sheet 10.

(Re. Embodiment of Display Front Plate)

For example, the display front plate 30 is provided, on a face of the light incident side of a substrate layer 35, with a colored lenticular lens 32 for vertical diffusion. According to the embodiment, since superfluous lights, such as an external light, a vagus light etc., are totally reflected by the surface of the lenticular lens 32, it is possible to obtain the fine contrast in comparison with a measure to apply an uniform coloring on the whole front plate.

Needless to say, the display front plate 30 may be provided, on a light emitting face 34 of the substrate layer 35, with a variety of functional layers, such as an anti-reflection layer, a low reflective layer, a polarization filtering layer, an antistatic layer, an anti-glare layer, a hard coated layer and so on.

[EMBODIMENTS]

The present invention will be described in more detail, with reference to concrete applications as follows.

(Embodiment 1)

The lenticular lens sheet 10 was made of impact resistance acrylic resin (a refractive index: 1.51), having the lens portion 12 (a pitch P of 0.2 mm; a transverse diameter a of 0.12 mm; a longitudinal diameter b of 0.15 mm), a sheet thickness to of 1.0 mm and a thickness $t_1$ of the colored layer 13 of 0.06 mm.

(Embodiment 2)

On the light emitting face of the lens portion 12 similar to that of Experiment 1, a transparent film having anti-reflection layer thereon was laminated.

(Comparative Example 1)

We prepared a single-faced lenticular lens sheet having a colored body. The single-faced lenticular lens sheet has a configuration identical to that of the lenticular lens sheet 10 of Embodiment 1 and exhibits a screen gain substantially equal to that of Embodiment 1.

Being associated with the Fresnel lens sheet into which diffusion agents of acrylic beads (an average of particle size: 30$\mu$) are mixed, the lenticular lens sheets of Embodiment 1 and Comparative example 1 were assembled in the rear projection TV using a LCD light source for comparative observation: the lenticular lens sheets of Embodiment 1 on the right-hand side of the TV; the lenticular lens sheets of Comparative example 1 on the left-hand side of the TV. As the result of comparative observation in a room with lighted fluorescent lamps, it was found that the screen of Embodiment 1 exhibits a fine contrast.

Next, on condition that the lenticular lens sheets of Embodiment 1, Embodiment 2 and Comparative example 1 and the BS lenticular lens sheet (BS ratio: 45%; a pitch p=0.72) are associated with the Fresnel lens sheet into which diffusion agents of acrylic beads (an average of particle size: 30$\mu$), their transmissivity and reflectivity at 550 nm were measured by a spectrophotometer (UV 2100 made by Shimazu Seisakusho Co. Ltd.) and respective ratio of transmissivity to reflectivity were calculated. The result is that the ratio of Embodiment 1 is twice or more as large as that of Comparative example 1, while the ratio of Embodiment 2 is similar to that of BS lenticular lens sheet, as shown with Table 1 below.

TABLE 1

|  | transmissivity [%] | reflectivity [%] | transmissivity/ reflectivity |
|---|---|---|---|
| Embodment 1 | 63.0 | 11.7 | 5.4 |
| Embo. 2 (AR) | 63.3 | 8.4 | 7.5 |
| Comp. 1 (BODY) | 63.3 | 27.8 | 2.3 |
| Comp. 2 (BS) | 70.4 | 9.4 | 7.5 |

(Embodiments 3)

The lenticular lens sheet 10 was made of the impact resistance acrylic resin, having the lens portion 12 (a pitch P of 0.4 mm; a transverse diameter a of 0.12 mm; a longitudinal diameter b of 0.28 mm), a sheet thickness to of 1.0 mm and a thickness $t_1$ of the colored layer 13 of 0.06 mm (the ideal thickness of the colored layer: 0.056 mm). Then, the transmissivity and reflectivity of this lenticular lens sheet were measured by the spectrophotometer. The result exhibited the transmissivity of 65%, the reflectivity of 7.2% and the ratio of transmissivity to reflectivity of 9.0.

As a comparison, the lenticular lens sheet having the identical configuration but the thickness $t_1$ of the colored layer of 0.10 mm was prepared and the transmissivity and reflectivity were also measured by the spectrophotometer. The result exhibited the transmissivity of 62%, the reflectivity of 8.0% and the ratio of transmissivity to reflectivity of 7.8.

(Embodiment 4)

The lenticular lens sheet 10 was made of the impact resistance acrylic resin (a refractive index: 1.51), having the lens portion 12 (a pitch P of 0.14 mm; a transverse diameter a of 0.07 mm; a longitudinal diameter b of 0.09 mm), a sheet thickness $t_0$ of 0.9 mm and a thickness $t_1$ of the colored layer 13 of 0.04 mm.

Some samples were prepared in the embodiment 4. In the samples:

an sample 4-1 comprises the substrate layer into which the diffusion agents are not mixed and the colored layer into which styrene beads of 7.5 weight parts with respect to 100 weight parts of resinous material are mixed;

an sample 4-2 comprises the substrate layer into which acrylic beads of 0.1 weight parts with respect to 100 weight parts of resinous material are mixed and the colored layer into which the styrene beads of 7.0 weight parts with respect to 100 weight parts of resinous material are mixed; and an sample 4-3 comprises the substrate layer and the colored layer both of which contain the styrene beads of 0.9 weight parts with respect to 100 weight parts of resinous material.

The result is shown in Table 2 below. From the table, it will be understood that the less the diffusivity of the substrate layer becomes, the more preferably the contrast becomes.

TABLE 2

|  | diffusion agents (substrate layer) | diffision agents (colored layer) | trans- missivity [%] | reflectivity [%] | trans- missivity/ reflectivity |
| --- | --- | --- | --- | --- | --- |
| Sample 4-1 | — | SBX 7.5 | 51.1 | 6.8 | 7.5 |
| Sample 4-2 | MBX 0.1 | SBX 7.0 | 52.5 | 7.1 | 7.4 |
| Sample 4-3 | SBX 0.9 | SBX 0.9 | 51.3 | 8.8 | 5.8 |

(Embodiment 5)

The lenticular lens sheets (different thickness) of claim 1 were produced by a double-layered extruding method (co-extruding method) methacrylic material. Next, each of the resulting lenticular lens sheets was abutted against a Fresnel lens sheet of 2 mm in thickness and respective four sides of both sheets were fixed with each other by means of tapes for setting-up.

Thereafter, the so-obtained transmission type projection screens were assembled into the transmission type projection TV for estimating a reflection of the room light thereon.

In addition, the front plate now in use, which is made of the methacrylic material, was also estimated as a comparison. The estimation is shown in Table 3 below.

TABLE 3

| Sample | 5-1 | 5-2 | 5-3 | 5-4 | 5-5 | Comparison | Comparison |
| --- | --- | --- | --- | --- | --- | --- | --- |
| Thickness | 1.5 | 2.0 | 3.0 | 0.5 | 1.0 | — | — |
| Thickness of Front Plate | — | — | — | — | — | 2.0 | 3.0 |
| Reflection | ○ | ○ | ⊚ | X | X | ○ | ⊚ |

* 1 Note: Estimation STD. for Reflected Image
no distortion in reflected image - - - ⊚
little distorted image in a viewpoint moving up and down, but no distortion in the stable viewpoint - - - ○
distorted image in spite of the stable viewpoint - - - X From the Table 3, it will be understood that the lenticular lens sheet having a thickness more than 1.5 mm makes it difficult for an viewer to confirm the distortion in reflected image, providing a fine outward appearance. Further, under a comparison with the front plates of the identical thickness, it is found that both sheets of the identical thickness exhibit the same estimation results.

As mentioned above, according to the present invention, it is possible to prevent the external light from reflecting without decreasing the intensity of image light so much, so that the contrast of image on the screen can be enhanced. Furthermore, it is possible to progress the fine pitching of image.

Finally, it will be understood by those skilled in the art that the foregoing description is preferred embodiments of the lenticular lens sheet, the display front plate and the transmission type projection screen, and that various changes and modifications may be made to the present invention without departing from the spirit and scope thereof.

What is claimed is:

1. A lenticular lens sheet comprising:

a substrate layer;

a lens portion having a "lenticular lens" configuration which is shaped so as to be convex on a light incident face side of said substrate layer; and an achromatic or chromatic colored layer formed adjacent to at least a light incident face of said lens portion;

wherein said substrate layer is either non-colored or colored paler than said colored layer.

2. A lenticular lens sheet as claimed in claim 1, wherein said colored layer has a configuration along a shape of said lens portion.

3. A lenticular lens sheet as claimed in claim 1 or 2, wherein said colored layer has a thickness from 0.05 to 1.0 times as large as a pitch of the lenticular lens configuration.

4. A lenticular lens sheet as claimed in claim 1, wherein said colored layer has a thickness less than one a half (½) of a thickness of the lenticular lens sheet.

5. A lenticular lens sheet as claimed in claim 1, wherein the lenticular lens configuration of said lens portion has a substantially elliptical cross section and a thickness of said colored layer at the top of the lenticular lens configuration is represented by:

$$t_1 = b - b^2/(a^2 + b^2)^{1/2}$$

wherein $t_1$ is the thickness of said colored layer at the top portion;

a is a transverse diameter of the elliptical cross section; and b is a longitudinal diameter of the elliptical cross section.

6. A lenticular lens sheet as claimed in claim 1, wherein a thickness of said colored layer is established so as to meet an inequality represented by:

$$t_1 > t_2$$

wherein $t_1$ is a thickness of each center part of said lens portion; and $t_2$ is a thickness of each foot part of said lens portion, the thickness being perpendicular to a lens surface thereof.

7. A lenticular lens sheet as claimed in claim 1, wherein at least said colored layer contains additive diffusion agents.

8. A lenticular lens sheet as claimed in claim 7, wherein it is established of an unequal relationship represented by:

$$0 \leq C_0 < C_1$$

wherein $C_0$ is a weight concentration of an additive diffusion agents added into said substrate layer; and $C_1$ is a weight concentration of said additive diffusion agents added into said colored layer.

9. A lenticular lens sheet as claimed in claim 1, further comprising a diffusion layer which is formed between said colored layer and said substrate layer and into which diffusion agents are mixed, wherein said colored layer does not contain the diffusion agents and said substrate layer is either non-colored or colored paler than said colored layer.

10. A lenticular lens sheet as claimed in claim 1, wherein the lenticular lens configuration includes a portion a tangential line of which exhibits an angle more than a critical angle with respect to a surface of the lenticular lens sheet.

11. A lenticular lens sheet as claimed in claim 1, wherein said substrate layer has a light emitting projection face consisting of a flat surface or a mat surface.

12. A lenticular lens sheet as claimed in claim 11, wherein a thickness of the lenticular lens sheet is more than 1.5 mm.

13. A lenticular lens sheet as claimed in claim 11 or 12, wherein said substrate layer is provided, on a light emitting face thereof, with at least one of an anti-reflection layer, a low reflecting layer, a polarization filtering layer, an anti-static layer, an anti-glare treatment layer and a hard coated treatment layer.

14. A display front plate comprising:

a substrate layer; and a lens portion having a "lenticular lens" configuration which is shaped so as to be convex on a light incident face side of said substrate layer;

wherein said lens portion has an achromatic or chromatic colored layer formed adjacent to at least a light incident face of said lens portion;

wherein said substrate layer has a light emitting face consisting of a flat surface or a mat surface.

15. A display front plate as claimed in claim 14, wherein said substrate layer is provided, on a light emitting face thereof, with at least one of an anti-reflection layer, a low reflecting layer, a polarization filtering layer, an anti-static layer, an anti-glare treatment layer and a hard coated treatment layer.

16. A transmission type projection screen comprising:

a lenticular lens sheet including:

a substrate layer;

a lens portion having a "lenticular lens" configuration which is shaped so as to be convex on a light incident face side of said substrate layer; and an achromatic or chromatic colored layer formed adjacent to at least a light incident face of said lens portion;

wherein said substrate layer is either non-colored or colored paler than said colored layer; and a Fresnel lens sheet arranged on a light source's side of said lenticular lens sheet.

17. A transmission type projection screen as claimed in claim 16, further comprising a display front plate arranged on a viewer's side of said lenticular lens sheet, wherein said display front plate comprises:

a substrate layer; and a lens portion having a "lenticular lens" configuration which is shaped so as to be convex on a light incident face side of said substrate layer;

wherein said lens portion has an achromatic or chromatic colored layer formed adjacent to at least a light incident face of said lens portion;

wherein said substrate layer has a light emitting face consisting of a flat surface or a mat surface.

18. A transmission type projection screen as claimed in claim 17, wherein said substrate layer is provided, on a light emitting face thereof, with at least one of an anti-reflection layer, a low reflecting layer, a polarization filtering layer, an anti-static layer, an anti-glare treatment layer and a hard coated treatment.

19. A transmission type projection screen as claimed in any one of claims 16 to 18, wherein said transmission type projection screen has a transmissivity of total light beams from 40 to 70 percent.

* * * * *